(12) United States Patent
Notarnicola et al.

(10) Patent No.: US 10,787,846 B2
(45) Date of Patent: Sep. 29, 2020

(54) ADDITIVELY MANUFACTURED HINGE ASSEMBLY

(71) Applicant: General Electric Company, Schenectady, NY (US)

(72) Inventors: Michael Robert Notarnicola, Cincinnati, OH (US); Stephen Joseph Waymeyer, Batavia, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/054,338

(22) Filed: Aug. 3, 2018

(65) Prior Publication Data
US 2020/0040627 A1 Feb. 6, 2020

(51) Int. Cl.
*E05D 3/10* (2006.01)
*E05D 5/14* (2006.01)
(Continued)

(52) U.S. Cl.
CPC .................. *E05D 5/14* (2013.01); *E05D 3/02* (2013.01); *E21B 21/08* (2013.01); *B33Y 10/00* (2014.12);
(Continued)

(58) Field of Classification Search
CPC .... E05D 5/14; E05D 5/16; E05D 3/02; E05D 3/10; E21B 21/08; E21B 21/10;
(Continued)

(56) References Cited

U.S. PATENT DOCUMENTS

| 6,176,129 B1 | 1/2001 | Aguesse et al. |
| 7,017,877 B2 * | 3/2006 | Melton ................... F16B 45/00 248/304 |

(Continued)

FOREIGN PATENT DOCUMENTS

| EP | 3469944 A1 * | 4/2019 | ............. A44C 27/00 |
| GB | 2503422 A | 1/2014 | |
| WO | WO2016/133497 A1 | 8/2016 | |

OTHER PUBLICATIONS

U.S. Appl. No. 15/706,860, filed Sep. 18, 2017.
(Continued)

*Primary Examiner* — Chuck Y Mah
(74) *Attorney, Agent, or Firm* — Dority & Manning, P.A.

(57) ABSTRACT

A hinge assembly and a method of additively manufacturing the same are provided. The hinge assembly includes a hub defining a body and a first mounting arm and a second mounting arm each projecting from the body. The first mounting arm and the second mounting arm are spaced from one another and define a hinge axis. The hinge assembly also includes a rotatable member or vane rotatably coupled with the hub and positioned between the first mounting arm and the second mounting arm. The rotatable member defines a vane hinge member or hinge member having a first nesting feature shaped complementary to a portion the first mounting arm and a second nesting feature shaped complementary to a portion of the second mounting arm of the hub to nest the hinge member between the first mounting arm and the second mounting arm. The hub and the rotatable member are simultaneously additively manufactured as distinct, but inseparable monolithic components.

20 Claims, 9 Drawing Sheets

(51) Int. Cl.
*E05D 3/02* (2006.01)
*E21B 21/08* (2006.01)
*B33Y 10/00* (2015.01)
*B33Y 80/00* (2015.01)
*F04D 19/00* (2006.01)
*F04D 29/32* (2006.01)
*F04D 29/36* (2006.01)

(52) U.S. Cl.
CPC .............. *B33Y 80/00* (2014.12); *F04D 19/002* (2013.01); *F04D 29/329* (2013.01); *F04D 29/36* (2013.01)

(58) Field of Classification Search
CPC ......... E21B 21/12; B33Y 10/00; B33Y 80/00; F04D 19/002; F04D 29/329; F04D 29/36; F04D 29/364; Y10T 16/535; Y10T 16/5472
See application file for complete search history.

(56) References Cited

U.S. PATENT DOCUMENTS

| | | | |
|---|---|---|---|
| 7,674,361 B2 | 3/2010 | Cohen | |
| 9,500,230 B2 | 11/2016 | Hiller et al. | |
| 9,562,616 B2 | 2/2017 | Strom et al. | |
| 9,752,364 B2* | 9/2017 | James | E05D 11/1014 |
| 2016/0237948 A1 | 8/2016 | Harris | |
| 2016/0238251 A1 | 8/2016 | Chang | |
| 2016/0333853 A1* | 11/2016 | Knight | F03D 80/88 |
| 2016/0363221 A1 | 12/2016 | Kamp et al. | |
| 2017/0023061 A1 | 1/2017 | Sanz | |
| 2017/0028640 A1 | 2/2017 | Harrison et al. | |
| 2017/0072634 A1 | 3/2017 | Reznar | |
| 2017/0096847 A1 | 4/2017 | Liu et al. | |
| 2017/0181803 A1 | 6/2017 | Mayer-Ullmann et al. | |
| 2017/0200997 A1* | 7/2017 | Gomberg | H01P 1/062 |
| 2017/0203528 A1 | 7/2017 | Calvel et al. | |
| 2017/0248802 A1 | 8/2017 | Rasschaert et al. | |
| 2017/0260928 A1 | 9/2017 | Crawford | |
| 2017/0283051 A1 | 10/2017 | Radekopf et al. | |
| 2017/0328418 A1 | 11/2017 | Carlini | |
| 2017/0356296 A1 | 12/2017 | Tibbott et al. | |
| 2018/0216380 A1* | 8/2018 | Butler | E05D 1/06 |
| 2018/0292863 A1* | 10/2018 | Escamilla | G06F 1/1641 |
| 2019/0085983 A1* | 3/2019 | Dunham | F16K 1/2028 |
| 2019/0094917 A1* | 3/2019 | Schmelzle | F16C 11/04 |
| 2019/0234535 A1* | 8/2019 | Reznar | B29C 45/0017 |

OTHER PUBLICATIONS

U.S. Appl. No. 15/706,867, filed Sep. 18, 2017.
U.S. Appl. No. 15/706,879, filed Sep. 18, 2017.
International Search Report Corresponding to Application No. PCT/US2019/044363 dated Oct. 17, 2019.

* cited by examiner

ADDITIVELY MANUFACTURED HINGE ASSEMBLY

FIELD

The present subject matter relates generally to a hinge assembly, and more particularly to an additively manufactured hinge assembly.

BACKGROUND

Hinges are commonly used in a variety of industries for allowing relative movement between components. For example, in the oil and gas industry, a hinge assembly may be used as part of a downhole flow meter for measuring a fluid influx or flow through the well. Such fluid measurements may be used for a variety of purposes, e.g., for production logging. Such downhole hinge assemblies may include a central hub and a plurality of vanes extending therefrom. The vanes may be actuated between a retracted position in which the vanes fold inward toward the hub and extend substantially vertically and an expanded position in which the vanes span outward from the hub generally orthogonal to the vertically oriented well. When the hinge assembly is moved vertically along the well, the vanes are moved to the retracted position, e.g., to protect the vanes and the casing lining the well. To measure fluid flow through the well, the vanes are actuated to the expanded position and spun about the hub.

Conventional hinge assemblies include multiple components that must be separately manufactured, procured, assembled and/or maintained. For example, assembling a hinge assembly as described above requires aligning the vanes in place with the hub and passing a rotation pin therethrough. Other components are used to connect the vanes in place with the hub. Thus, such hinge assemblies are more expensive due to the increased number of components needed and the assembly time required. In addition, each joint, fastening point, or other mating surface introduces a potential failure point. Therefore, certain conventional hinge assemblies may cost more, may be less reliable, and may generally be subject to multiple failure points.

Accordingly, an improved hinge assembly would be useful. More specifically, a hinge assembly that is reliable and easy to manufacture and assemble would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additively manufactured hinge assembly is provided. The hinge assembly includes a hub defining a body and a first mounting arm and a second mounting arm each projecting from the body. The first mounting arm and the second mounting arm are spaced from one another and define a hinge axis. Further, the hinge assembly includes a rotatable member rotatably coupled with the hub and movable about the hinge axis between a retracted position and an extended position, the rotatable member defining a hinge member having a first nesting feature shaped complementary to at least a portion of the first mounting arm and a second nesting feature shaped complementary to at least a portion of the second mounting arm to nest the hinge member between the first mounting arm and the second mounting arm. The hub and the rotatable member are simultaneously additively manufactured as distinct, but inseparable monolithic components.

In another exemplary embodiment of the present disclosure, a method for manufacturing a hinge assembly is provided. The method includes depositing a layer of additive material on a bed of an additive manufacturing machine. The method also includes directing energy from an energy source of the additive manufacturing machine to successively fuse one or more layers of additive material on top of the layer of additive material to form the hinge assembly. The formed hinge assembly includes a hub defining a body and a first mounting arm and a second mounting arm each projecting from the body, wherein the first mounting arm and the second mounting arm are spaced from one another and define a hinge axis. Moreover, the formed hinge assembly includes a rotatable member rotatably coupled with the hub and positioned between the first mounting arm and the second mounting arm, the rotatable member defining a hinge member having a first nesting feature shaped complementary to at least a portion the first mounting arm of the hub and a second nesting feature shaped complementary to at least a portion of the second mounting arm of the hub to nest the hinge member between the first mounting arm and the second mounting arm. Wherein during directing, the hub and the rotatable member are simultaneously additively manufactured as distinct, but inseparable monolithic components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, terms of approximation, such as "approximately," "substantially," or "about," refer to being within a ten percent margin of error.

The present disclosure is generally directed to a hinge assembly and a method of additively manufacturing the same. The hinge assembly includes a hub defining a body and a first mounting arm and a second mounting arm each projecting from the body. The first mounting arm and the second mounting arm are spaced from one another and define a hinge axis. The hinge assembly also includes a rotatable member or vane rotatably coupled with the hub and positioned between the first mounting arm and the second mounting arm. The vane defines a hinge member or vane hinge member having a first nesting feature shaped complementary to at least a portion the first mounting arm and a second nesting feature shaped complementary to at least a portion of the second mounting arm of the hub to nest the hinge member between the first mounting arm and the second mounting arm. The hub and the rotatable member are simultaneously additively manufactured as distinct, but inseparable monolithic components.

Figure 1:
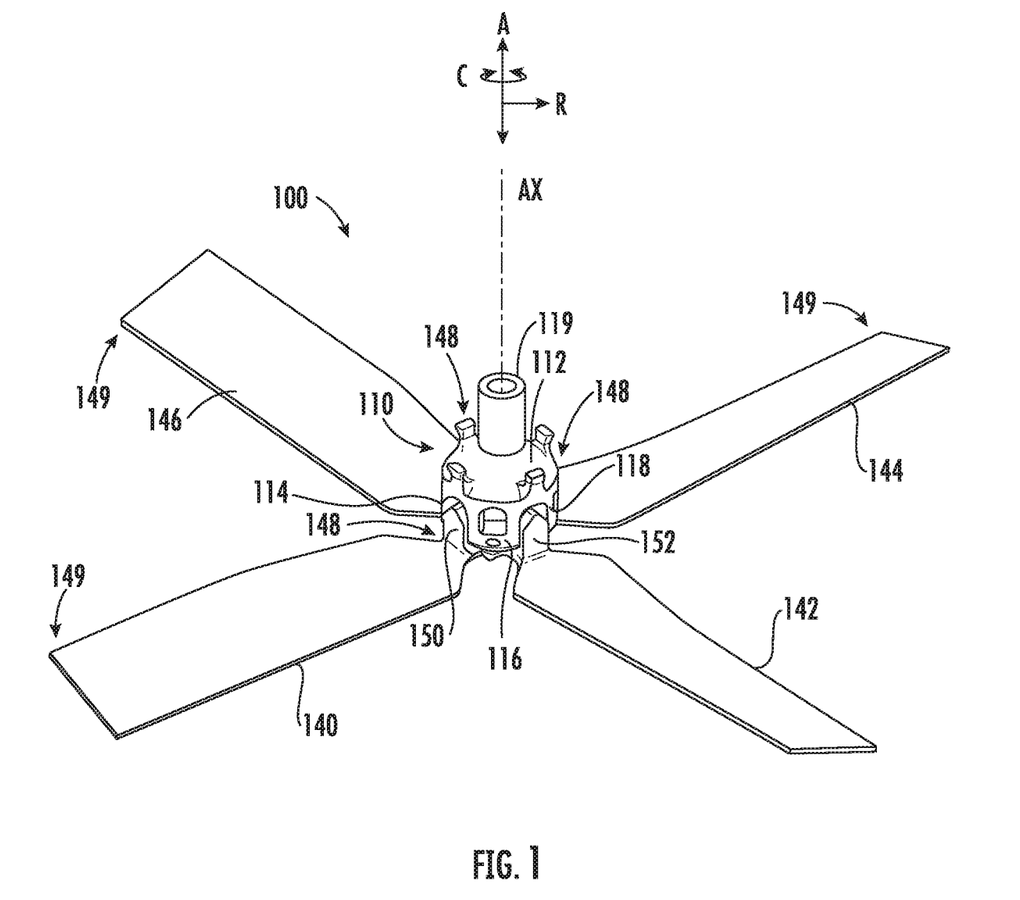
FIG. 1 provides a perspective view of an exemplary hinge assembly that includes a plurality of vanes in an extended position in accordance with exemplary embodiments of the present disclosure.

FIGS. 1 through 7 provide various views of an exemplary hinge assembly 100 in accordance with exemplary embodiments of the present disclosure. Although the construction and method of making the hinge assembly 100 are described generally herein, it should be appreciated that hinge assembly 100 can be configured for use in any suitable application and in any suitable industry. For example, the concepts described herein could be used in the oil and gas or petroleum industry, aviation and space exploration, maritime, and other industries. Moreover, FIG. 1 illustrates an exemplary embodiment of the hinge assembly 100 for the purpose of explaining its general operation, but the size, shape, and configuration of hinge assembly 100 is not intended to limit the scope of the present subject matter.

In general, the exemplary embodiments of the hinge assembly 100 described herein may be manufactured or formed using any suitable process. However, in accordance with several aspects of the present subject matter, some or all of hinge assembly 100 may be formed using an additive-manufacturing process, such as a 3-D printing process. The use of such a process may allow hinge assembly 100 to be formed integrally, as a single monolithic component, or as any suitable number of sub-components. In particular, the manufacturing process may allow hinge assembly 100 to be integrally formed and include a variety of features not possible when using prior manufacturing methods. For example, the additive manufacturing methods described herein enable the manufacture of hinge assemblies having unique features, configurations, thicknesses, materials, densities, and structures not possible using prior manufacturing methods. Some of these novel features can, for example, permit relative motion between two components of the hinge assembly 100 after simultaneous formation of such components using an additive manufacturing process as described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and features that allow for relative motion between sub-components. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

As shown best in FIG. 1, the hinge assembly 100 defines an axial direction A, a radial direction R, and a circumferential direction C. Moreover, the hinge assembly 100 defines an axial centerline AX that extends therethrough for reference purposes. In general, the axial direction A extends parallel to the axial centerline AX, the radial direction R extends orthogonally to and from the axial centerline AX, and the circumferential direction C extends concentrically around the axial centerline AX.

The hinge assembly 100 includes a hub 110 defining a body 112 and a plurality of mounting arms projecting from the body 112. From the perspective of FIG. 1, a first mounting arm 114, a second mounting arm 116, and a third mounting arm 118 are shown projecting from the body 112. Although not shown, a fourth mounting arm projects from the body 112 as well. The first mounting arm 114 and the second mounting arm 116 are spaced from one another and define a hinge axis HA (see also FIG. 4). Likewise, the second mounting arm 116 and the third mounting arm 118 are spaced from one another and define a hinge axis HA. Similarly, the third mounting arm 118 and the fourth mounting arm are spaced from one another and define a hinge axis. Moreover, the fourth mounting arm and the first mounting arm 114 are spaced from one another and define a hinge axis HA. As will be described more fully below, a vane may be rotatably mounted between each of the mounting arms. As further shown in FIG. 1, the hub 110 also defines a shaft 119 projecting from the body 112, e.g., along the axial direction A opposite the direction the mounting arms project from the body 112. More particularly, the shaft 119 projects from the body 112 along the axial centerline AX.

Figure 2:
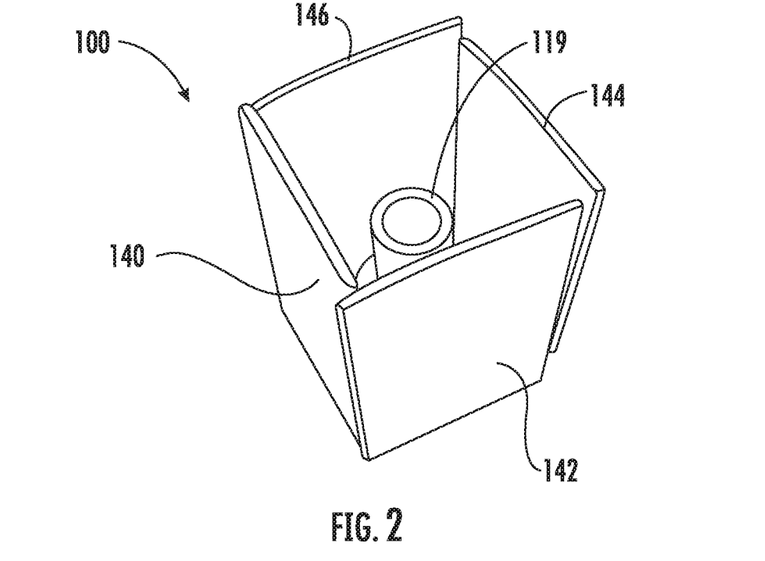
FIG. 2 provides a perspective view of the hinge assembly of FIG. 1 depicting the vanes in a retracted position.
Figure 3:
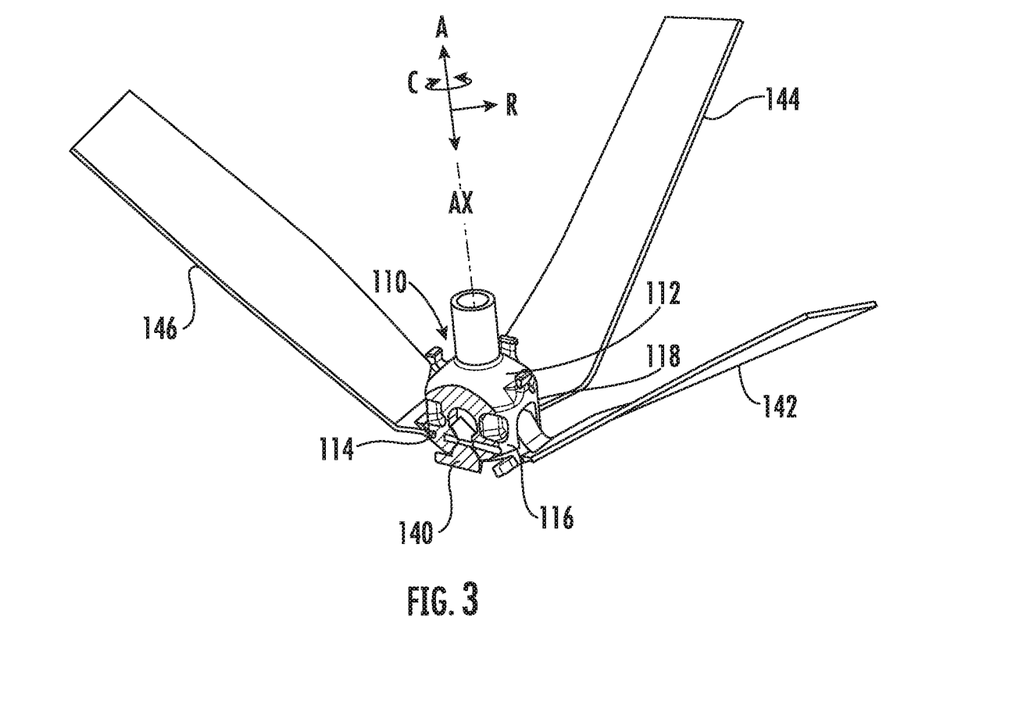
FIG. 3 provides a perspective view of the hinge assembly of FIG. 1 depicting the vanes being moved between the extended and retracted positions.

As further shown in FIGS. 1, 2, and 3, the hinge assembly 100 includes a plurality of rotatable member. For this embodiment, the rotatable members are vanes, including a first vane 140, a second vane 142, a third vane 144, and a fourth vane 146. Each vane 140, 142, 144, 146 extends between a proximal end 148 and a distal end 149. Further, the vanes 140, 142, 144, 146 are each movable about their respective hinge axes HA between and extended position shown in FIG. 1 and a retracted position shown in FIG. 2. FIG. 3 depicts the vanes 140, 142, 144, 146 moved between the retracted and extended positions. In the extended position, the vanes 140, 142, 144, 146 extend generally outward from the hub 110 along the radial direction R. In the retracted position, the vanes 140, 142, 144, 146 extend generally along the axial direction A. As one example, the hinge assembly 100 is configured as a flow meter for downhole applications in the oil and gas industry. To move the hinge assembly 100 vertically along a shaft or well, the vanes 140, 142, 144, 146 are moved to the retracted position (FIG. 2), e.g., to prevent damage to the vanes and/or casing of the well. To measure a fluid influx or flow through the well, e.g., for production logging, the vanes 140, 142, 144, 146 are moved to the expanded position (FIG. 1) and the vanes 140, 142, 144, 146 are spun about the axial centerline AX. Although four (4) vanes are shown in the depicted embodiment, it will be appreciated that embodiments having less than four (4) vanes or more than four (4) vanes are within the scope of the present disclosure.

Figure 4:
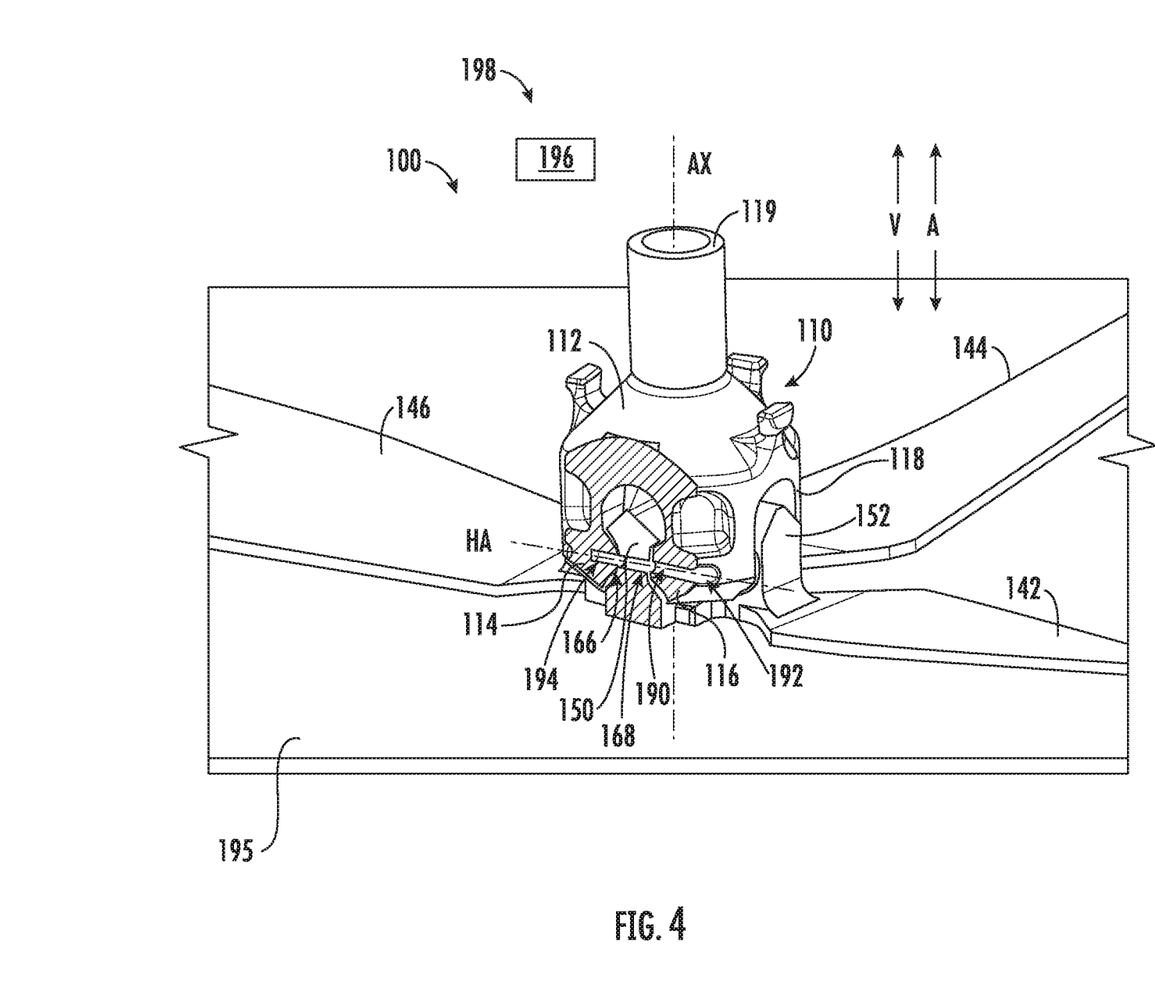
FIG. 4 provides a perspective view of the hinge assembly of FIG. 1 with one of the vanes and a hub of the hinge assembly shown in cross section.
Figure 5:
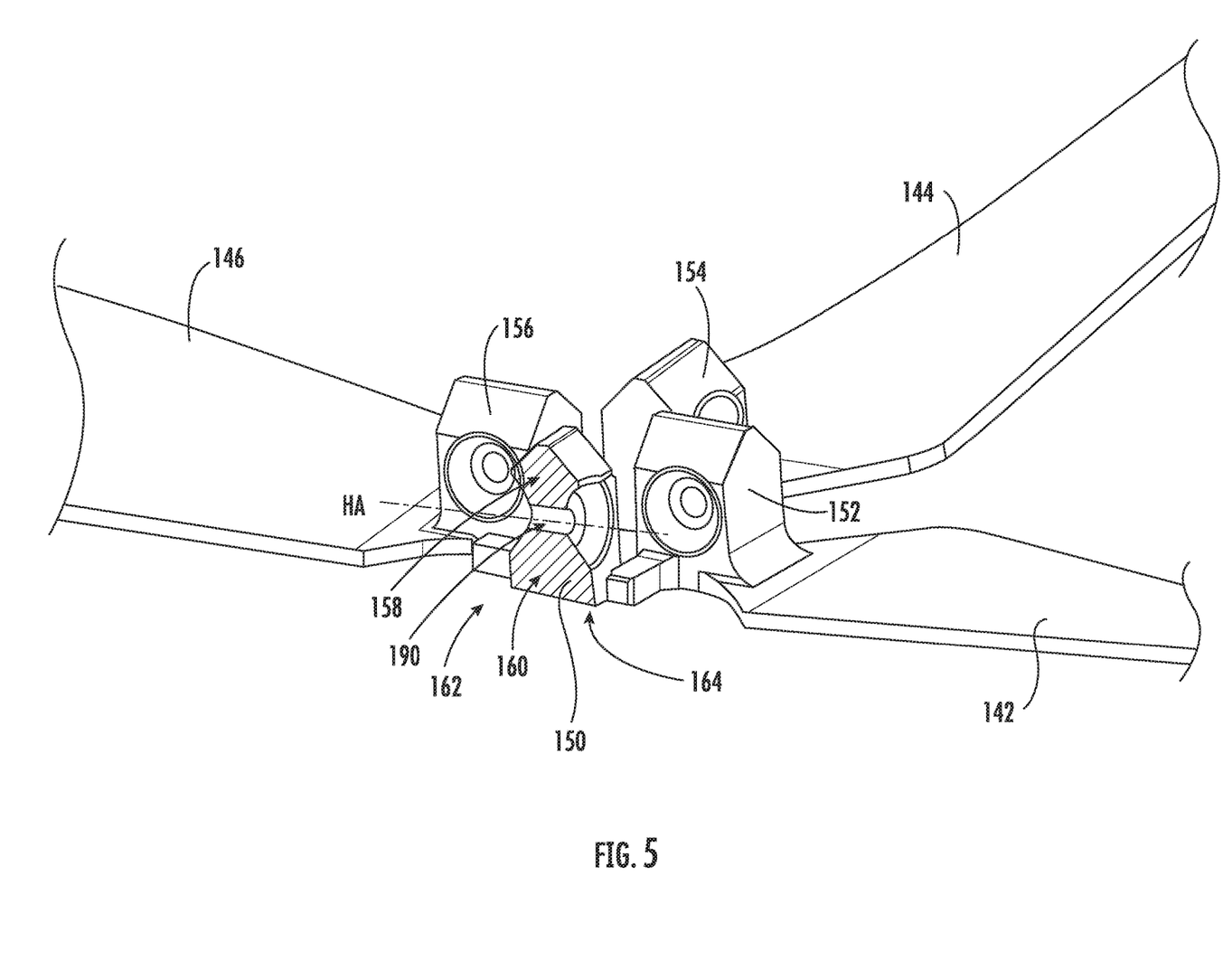
FIG. 5 provides a close up, perspective view of the vanes of the hinge assembly of FIG. 1.
Figure 6:
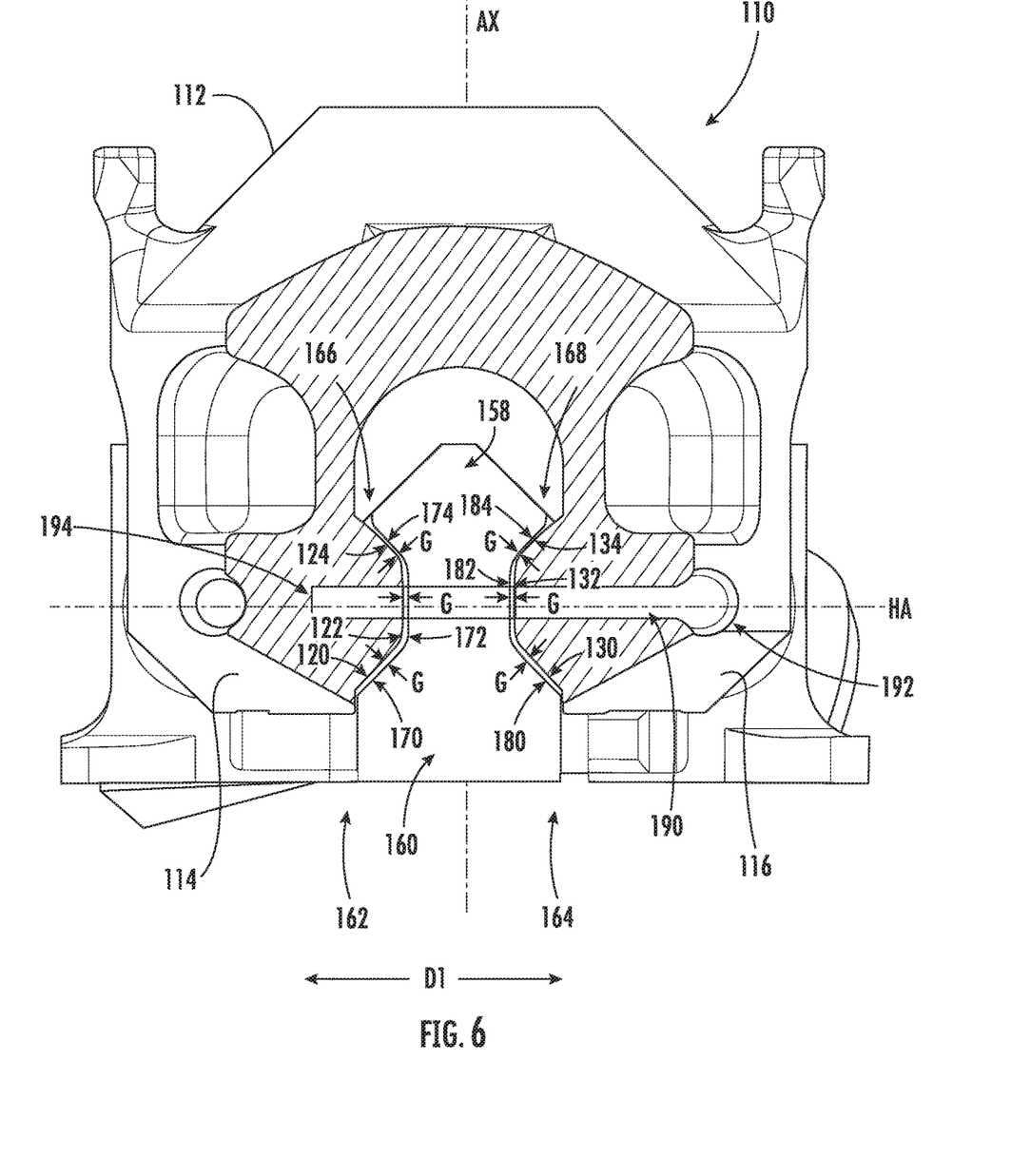
FIG. 6 provides a side elevation, cross-sectional view of the hinge assembly of FIG. 1.

FIGS. 4, 5, and 6 provide more detailed views of the construction of the hinge assembly 100 of FIGS. 1 and 2. In particular, FIG. 4 provides a perspective view of the hinge assembly of FIG. 1 with the first vane 140 and the hub 110 shown in cross section. FIG. 5 provides a close up, perspective view of the vanes of the hinge assembly 100 of FIG. 1 (with the hub 110 removed for additional clarity). FIG. 6 provides a side elevation, cross-sectional view of the hinge assembly 100 of FIG. 1.

As shown best in FIGS. 4 and 5, each vane 140, 142, 144, 146 defines a hinge member, or in this embodiment, a vane hinge member at their respective proximal ends 148. The vane hinge member 150 of the first vane 140 rotatably couples the first vane 140 with the hub 110, the vane hinge member 152 of the second vane 142 rotatably couples the second vane 142 with the hub 110, the vane hinge member 154 of the third vane 144 rotatably couples the third vane 144 with the hub 110, and the vane hinge member 156 of the fourth vane 146 rotatably couples the fourth vane 146 with the hub 110. More specifically, the vane hinge member 150 of the first vane 140 is rotatably mounted to the first mounting arm 114 and the second mounting arm 116 of the hub 110, the vane hinge member 152 of the second vane 142 is rotatably mounted to the second mounting arm 116 and the third mounting arm 118 of the hub 110, the vane hinge member 154 of the third vane 144 is rotatably mounted to the third mounting arm 118 and the fourth mounting arm of the hub 110, and the vane hinge member 156 of the fourth vane 146 is rotatably mounted to the fourth mounting arm and the first mounting arm 114 of the hub 110.

The first vane 140 is representative of the construction of the other vanes 142, 144, 146 and the first mounting arm 114 and the second mounting arm 116 of the hub 110 are representative of the construction of the other mounting arms; accordingly, the detailed construction and interfacing of first vane 140 with the first mounting arm 114 and the second mounting arm 116 described below is representative of how each of the vanes 140, 142, 144, 146 may interface with the mounting arms of the hub 110. As shown, the vane hinge member 150 of the first vane 140 extends between a top 158 and a base 160, e.g., along the axial direction A. The top 158 generally has a triangular cross section as viewed along the radial direction R. The vane hinge member 150 also extends between a first side 162 and a second side 164, e.g., along a first direction D1, which is a direction orthogonal to the axial direction A. As shown best in FIG. 6, the vane hinge member 150 has a first nesting feature 166 at its first side 162 and a second nesting feature 168 at its second side 164. Generally, the first nesting feature 166 is shaped complementary to at least a portion of the first mounting arm 114 and the second nesting feature 168 is shaped complementary to at least a portion of the second mounting arm 116 to nest the vane hinge member 150 between the first mounting arm 114 and the second mounting arm 116. As will be explained more fully below, the vane hinge member 150 is nested between the first mounting arm 114 and the second mounting arm 116 when the hinge assembly 100 is additively printed.

More particularly, the first nesting feature 166 of the vane hinge member 150 has a first converging surface 170, a first hinge surface 172, and a first diverging surface 174. The first converging surface 170, the first hinge surface 172, and the first diverging surface 174 are contiguous. That is, the first converging surface 170 is contiguous with the first hinge surface 172 and the first hinge surface 172 is contiguous with the first diverging surface 174. The second nesting feature 168 of the vane hinge member 150 mirrors the first nesting feature 166 along the first direction D1 and has a second converging surface 180, a second hinge surface 182, and a second diverging surface 184. The second converging surface 180, the second hinge surface 182, and the second diverging surface 184 are contiguous. That is, the second converging surface 180 is contiguous with the second hinge surface 182 and the second hinge surface 182 is contiguous with the second diverging surface 184.

For this embodiment, the first hinge surface 172 extends substantially along the axial direction A and the first converging surface 170 and the first diverging surface 174 are both angled with respect to the first hinge surface 172 and are angled substantially perpendicular to one another. That is, the first converging surface 170 and the first diverging surface 174 are angled opposite one another. Specifically, for this embodiment, the first converging surface 170 is angled about forty-five degrees (45°) with respect to the first hinge surface 172. As the first converging surface 170 and the first diverging surface 174 are angled perpendicular to one another, the first diverging surface 174 is angled about forty-five degrees (45°) with respect to the first hinge surface 172 in the opposite direction from which the first converging surface 170 is angled with respect to the first hinge surface 172.

Similarly, the second hinge surface 182 extends substantially along the axial direction A and the second converging surface 180 and the second diverging surface 184 are both angled with respect to the second hinge surface 182 and are angled substantially perpendicular to one another. That is, the second converging surface 180 and the second diverging surface 184 are angled opposite one another. More particularly, for this embodiment, the second converging surface 180 is angled about forty-five degrees (45°) with respect to the second hinge surface 182. As the second converging surface 180 and the second diverging surface 184 are angled perpendicular to one another, the second diverging surface 184 is angled about forty-five degrees (45°) with respect to the second hinge surface 182 in the opposite direction from which the second converging surface 180 is angled with respect to the second hinge surface 182.

As shown best in FIG. 6, the first mounting arm 114 has a first converging surface 120, a first hinge surface 122, and a first diverging surface 124. In a similar fashion, the second mounting arm 116 has a second converging surface 130, a second hinge surface 132, and a second diverging surface 134. Moreover, for the depicted embodiment of FIG. 6, the first converging surface 120 of the first mounting arm 114 is angled or shaped complementary to the first converging surface 170 of the first nesting feature 166, the first hinge surface 122 of the first mounting arm is shaped complementary to the first hinge surface 172 of the first nesting feature 166, and the first diverging surface 124 of the first mounting arm 114 is angled or shaped complementary to the first diverging surface 174 of the first nesting feature 166. Likewise, the second converging surface 130 of the second mounting arm 116 is angled or shaped complementary to the second converging surface 180 of the second nesting feature 168, the second hinge surface 132 of the second mounting arm 116 is shaped complementary to the second hinge surface 182 of the second nesting feature 168, and the second diverging surface 134 of the second mounting arm 116 is angled or shaped complementary to the second diverging surface 184 of the second nesting feature 168.

As further shown in FIGS. 4, 5, and 6, the first mounting arm 114, the second mounting arm 116, and the vane hinge member 150 of the first vane 140 define a hinge pin bore 190 that extends along the hinge axis HA. The hinge pin bore 190 is configured to receive a rotation pin (not shown) that facilitates actuation or movement of the first vane 140 between the extended and retracted positions. For this embodiment, the hinge pin bore 190 extends substantially along a direction orthogonal to the axial direction A (e.g., the first direction D1). Moreover, for this embodiment, the hinge pin bore 190 is a blind bore. That is, the hinge pin bore 190 extends between an open end 192 and a closed end 194. In some embodiments, the rotation pin may be printed into the hinge pin bore 190. Further, in some embodiments, no rotation pin is included.

Notably, according to the exemplary aspects of the present disclosure, the vanes 140, 142, 144, 146 and the hub 110 are simultaneously additively manufactured as distinct, but inseparable monolithic components. That is, the vanes 140, 142, 144, 146 and the hub 110 are printed in a single print. The vanes 140, 142, 144, 146 are printed such that the vanes 140, 142, 144, 146, are nested within the hub 110. That is, the vanes 140, 142, 144, 146 are interlocked or connected with the hub 110 yet are inseparable from the hub 110. Moreover, as the vanes 140, 142, 144, 146 are printed as distinct components from the hub 110, the vanes 140, 142, 144, 146 may rotate or move relative to the hub 110, e.g., during operation.

As illustrated schematically in FIG. 4, the hinge assembly 100 defines a vertical direction V, which is parallel with the axial direction A in this embodiment. The hub 110 and the vanes 140, 142, 144, 146 are additively manufactured on a build platform 195 along the vertical direction V by an energy source 196 of an additive manufacturing machine 198. In this regard, the hub 110 and the vanes 140, 142, 144, 146 are thus additively manufactured (e.g., "printed") simultaneously layer-by-layer along the vertical direction V using one or more of the additive manufacturing techniques described above. For instance, the hinge assembly 100 may be printed by first depositing a layer of additive material on the build platform 195 of the additive manufacturing machine 198. Next, energy from energy source 196 of the additive manufacturing machine 198 is selectively directed to successively fuse the plurality of layers of additive material on top of the layer of additive material to form the hinge assembly 100.

Further, as shown best in FIG. 6, when the hub 110 and the vanes 140, 142, 144, 146 are simultaneously additively manufactured as distinct, but inseparable monolithic components, a gap G is defined between the first converging surface 120 of the first mounting arm 114 and the first converging surface 170 of the first nesting feature 166. A gap G is defined between the first hinge surface 122 of the first mounting arm 114 and the first hinge surface 172 of the first nesting feature 166. A gap G is defined between the first diverging surface 124 of the first mounting arm 114 and the first diverging surface 174 of the first nesting feature 166. In addition, when the hub 110 and the vanes 140, 142, 144, 146 are simultaneously additively manufactured as distinct, but inseparable monolithic components, a gap G is defined between the second converging surface 130 of the second mounting arm 116 and the second converging surface 180 of the second nesting feature 168. A gap G is defined between the second hinge surface 132 of the second mounting arm 116 and the second hinge surface 182 of the second nesting feature. Further, a gap G is defined between the second diverging surface 134 of the second mounting arm 116 and the second diverging surface 184 of the second nesting feature 168.

Due at least in part to the geometry of the first mounting arm 114, the second mounting arm 116, and the vane hinge member 150 of the first vane 140 positioned therebetween, the gaps noted above are maintained and the first mounting arm 114, the second mounting arm 116, and the first vane 140 are all adequately supported as the hinge assembly 100 is built up along the vertical direction V. More particularly, the angled surfaces of the first converging and diverging surfaces 120, 124 of the first mounting arm 114 and the complementary first converging and diverging surfaces 170, 174 of the first nesting feature 166 of the vane hinge member 150 and the angled second converging and diverging surfaces 130, 134 of the second mounting arm 116 and the complementary second converging and diverging surfaces 180, 184 of the second nesting feature 168 of the vane hinge member 150 allow for hinge assembly 100 to be built up vertically with satisfactory gap clearance and integrity. A base 160 of the vane hinge member 150 and the angled first and second converging surfaces 170, 180 allow for the first and second hinge surfaces 172, 182 and the top 158 of the vane hinge member 150 to be adequately supported during printing. Moreover, the angled first and second converging surfaces 120, 130 of the first and second mounting arms 114, 116, respectively, adequately support the first and second mounting arms 114, 116, proximate their respective first and second hinge surfaces 122, 132. In some embodiments, the gap clearance may be on the order of a thousandth of an inch. For instance, in some embodiments, the gap between the surfaces is between 0.005 inches to 0.01 inches. Further, as the gap clearance integrity can be maintained, rotation pins may be eliminated from the hinge assembly 100.

Figure 7:
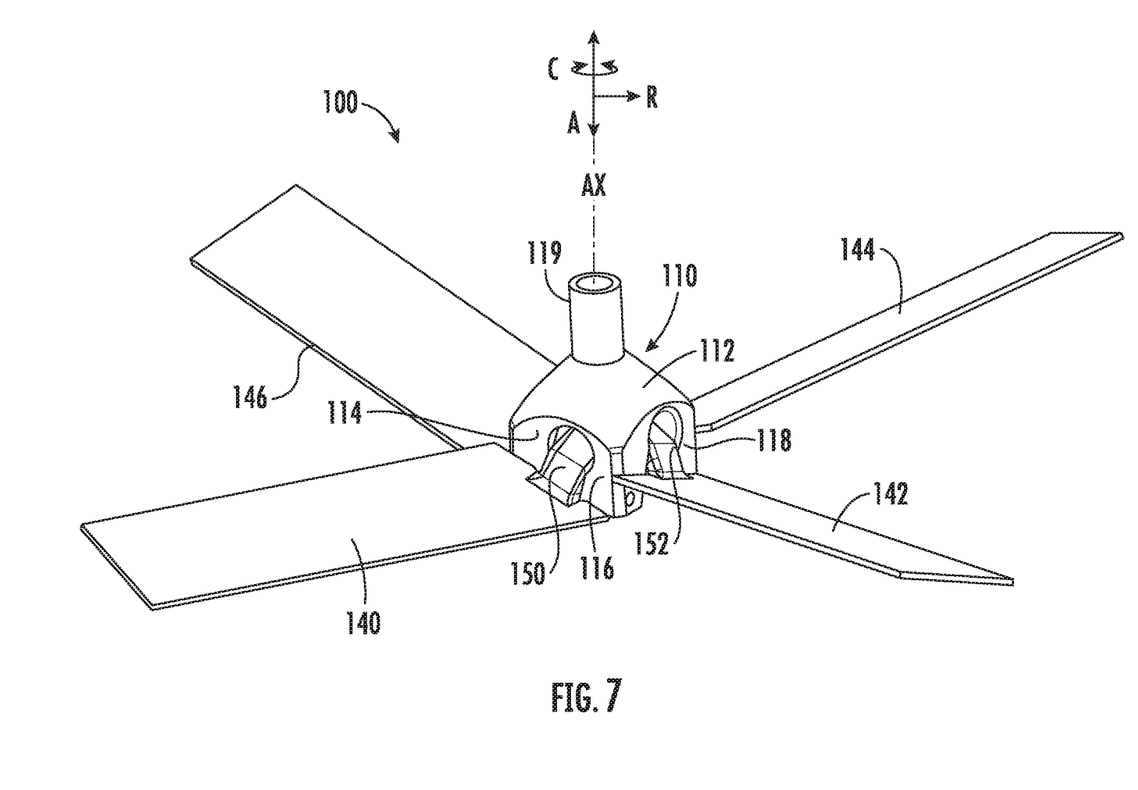
FIG. 7 provides a perspective view of another exemplary hinge assembly that includes a plurality of tilted vanes shown in an extended position in accordance with exemplary embodiments of the present disclosure.
Figure 8:
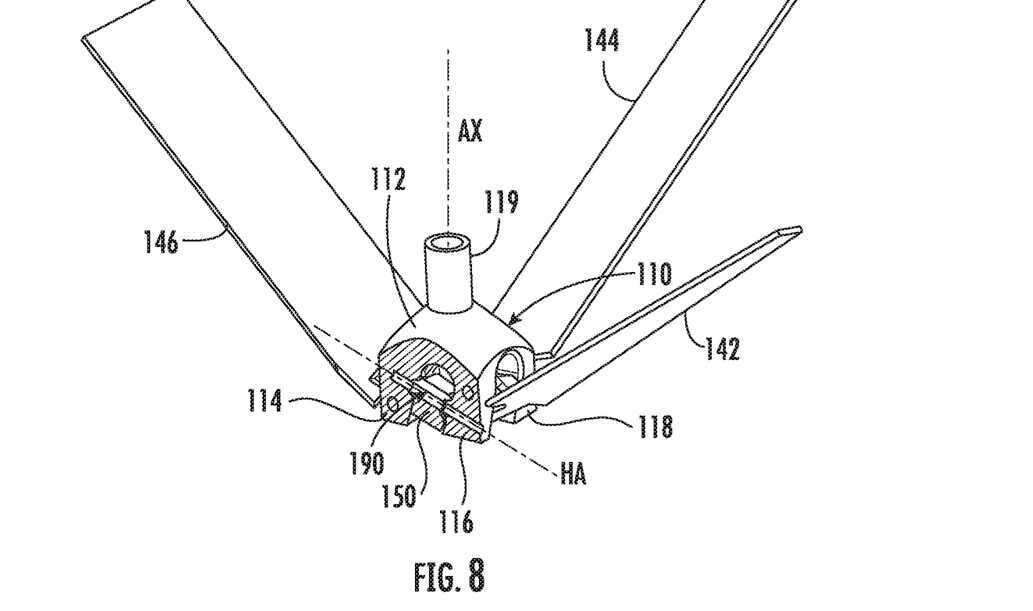
FIG. 8 provides a perspective view of the hinge assembly of FIG. 7 depicting the tilted vanes being moved between the extended position and a retracted position.
Figure 9:
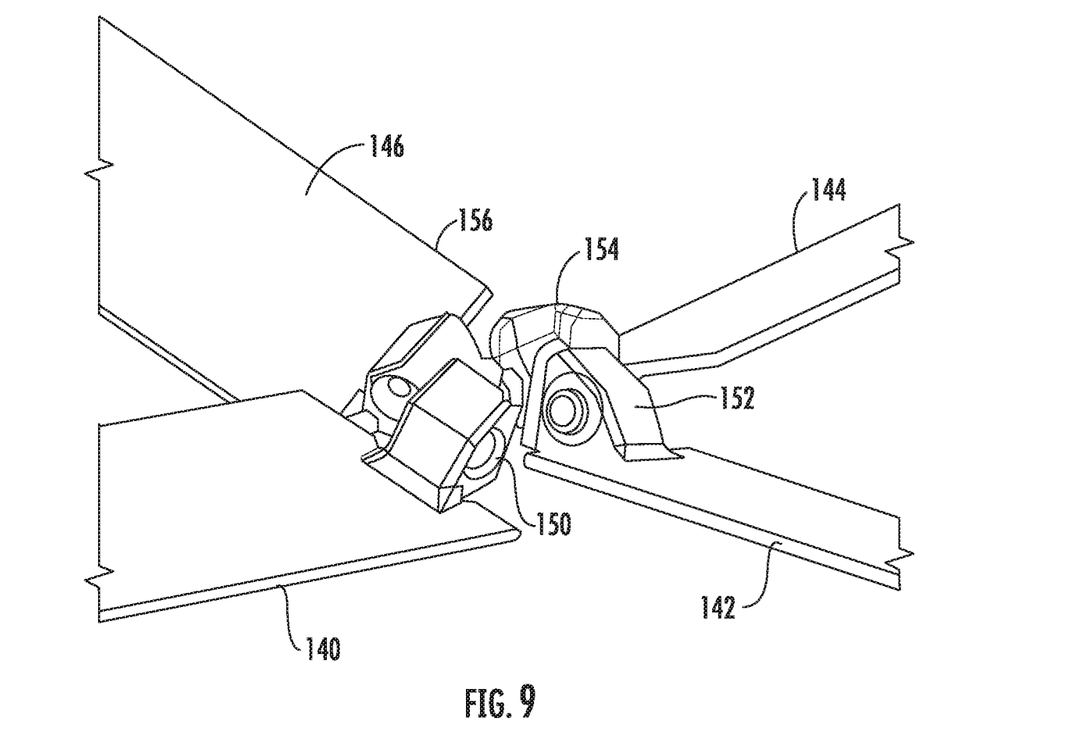
FIG. 9 provides a close up, perspective view of the vanes of the hinge assembly of FIG. 7.
Figure 10:
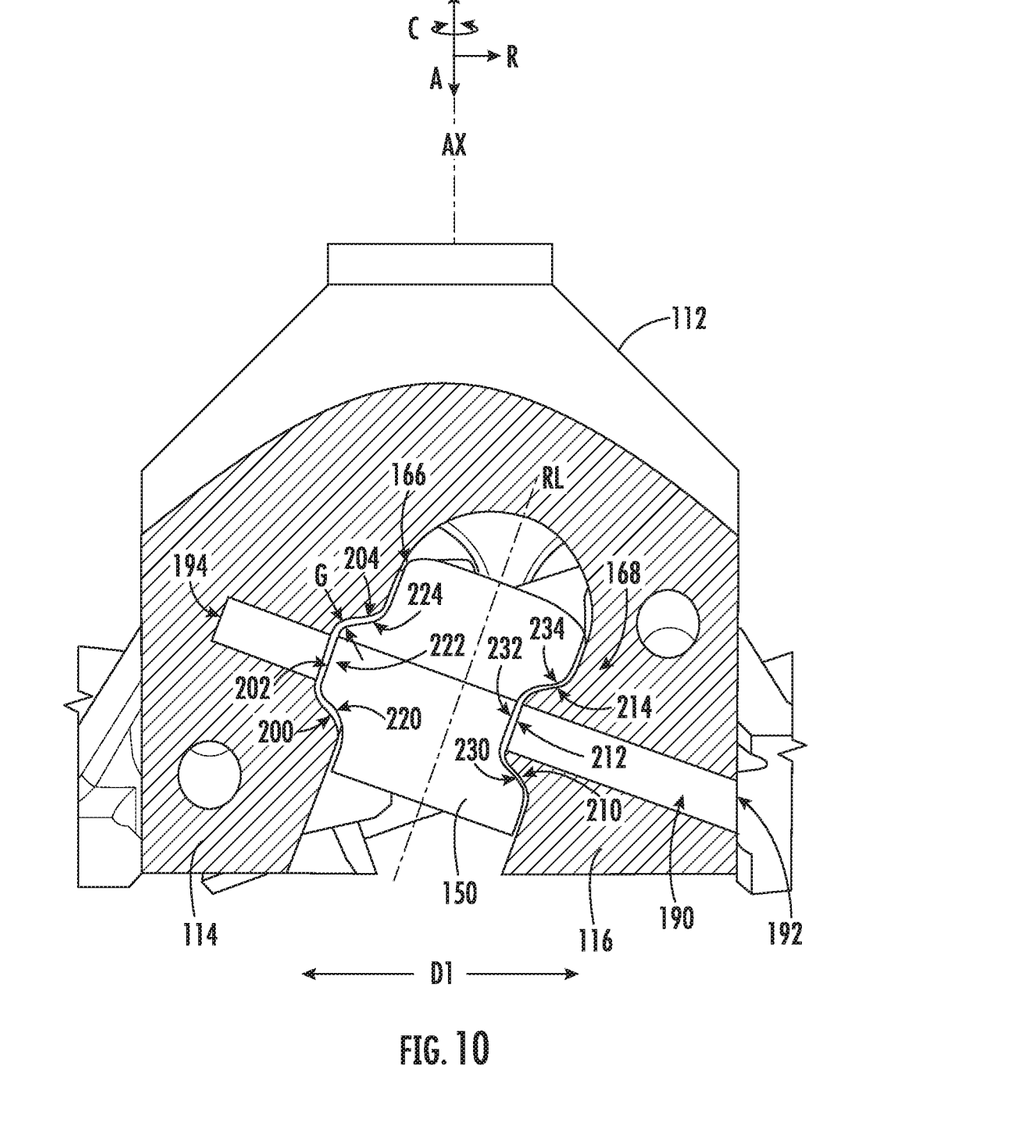
FIG. 10 provides a side elevation, cross-sectional view of the hinge assembly of FIG. 7.

FIGS. 7 through 10 provide various views of another exemplary hinge assembly 100 in accordance with exemplary embodiments of the present disclosure. In particular, FIG. 7 provides a perspective view of the hinge assembly 100 that includes a plurality of tilted vanes shown in an extended position. FIG. 8 provides a perspective view of the hinge assembly 100 of FIG. 7 depicting the tilted vanes being moved between the extended position and a retracted position. FIG. 9 provides a close up, perspective view of the titled vanes of the hinge assembly of FIG. 7. FIG. 10 provides a side elevation, cross-sectional view of the hinge assembly of FIG. 7. The hinge assembly 100 of FIGS. 7 through 10 may be additively manufactured and constructed in a similar fashion to the hinge assembly of FIGS. 1 through 7 except as provided below.

As shown, the vanes 140, 142, 144, 146 are each angled or tilted with respect to the axial direction A and a plane or direction orthogonal to the axial direction A (e.g., a first direction D1 for the first vane 140). That is, as shown best in FIGS. 8 and 10, the hinge axes HA of each of the vanes 140, 142, 144, 146 are angled with respect to the axial direction A and a plane or direction orthogonal to the axial direction A. For this embodiment, the hinge axes HA are angled about twenty degrees (20°) with respect to a plane orthogonal to the axial direction A. In some embodiments, the hinge axes HA are angled with respect to the axial direction A by at least fifteen degrees (15°) and angled with respect to the plane or direction orthogonal to the axial direction A by at least fifteen degrees (15°).

For this embodiment, the hinge axis HA of each vane 140, 142, 144, 146 is defined along their respective hinge pin bores. As shown in FIG. 10, the hinge pin bore 190 defined by the vane hinge member 150 of the first vane 140 and the first and second mounting arms 114, 116 is angled with respect to the axial direction A and a plane or direction orthogonal to the axial direction A. In some embodiments, the hinge pin bore 190 is angled with respect to the axial direction A by at least fifteen degrees (15°) and angled with respect to the plane or direction orthogonal to the axial direction A by at least fifteen degrees (15°).

As shown particularly in FIG. 10, the vane hinge member 150 of the first vane 140 defines a reference line RL that is angled with respect to the axial direction A and is perpendicular to the hinge axis HA. For this embodiment, the first nesting feature 166 of the vane hinge member 150 defines a bottom surface 200 angled with respect to the reference line RL, a hinge surface 202 contiguous with the bottom surface 200 and aligned substantially parallel with the reference line RL, and a top surface 204 contiguous with the hinge surface 202 and angled opposite the bottom surface 200 with respect to the reference line RL. The second nesting feature 168 of the vane hinge member 150 defines a bottom surface 210 angled with respect to the reference line RL, a hinge surface 212 contiguous with the bottom surface 210 and aligned substantially parallel with the reference line RL, and a top surface 214 contiguous with the hinge surface 212 and angled opposite the bottom surface 210 with respect to the reference line RL. The bottom surface 200 of the first nesting feature 166 is substantially parallel with the bottom surface 210 of the second nesting feature 168, the first hinge surface 172 of the first nesting feature 166 is substantially parallel with the second hinge surface 182 of the second nesting feature 168 and the reference line RL, and the top surface 204 of the first nesting feature 166 is substantially parallel with the top surface 214 of the second nesting feature 168. Moreover, for this embodiment, the first and second bottom surfaces 200, 210 are angled about forty-five degrees (45°) with respect to the reference line RL and the first and second top surfaces 204, 214 are angled opposite the bottom surfaces 200, 210 about forty-five degrees (45°) with respect to the reference line RL. Further, for this embodiment, the first nesting feature 166 and the second nesting feature 168 have rounded intersections where the bottom surfaces intersect with the hinge surfaces and where the hinge surfaces intersect with the top surfaces.

In order for the vane hinge member 150 of the first vane 140 to fit between the first and second mounting arms 114, 116, the first and second mounting arms 114, 116 have complementary surfaces to the nesting features 166, 168 of the vane hinge member 150. Specifically, the first mounting arm 114 defines a bottom surface 220 angled with respect to the reference line RL, a hinge surface 222 contiguous with the bottom surface 220 and aligned substantially parallel with the reference line RL, and a top surface 224 contiguous with the hinge surface 222 and angled opposite the bottom surface 220 of the first mounting arm 114 with respect to the reference line RL. In a similar fashion, the second mounting arm 116 defines a bottom surface 230 angled with respect to the reference line RL, a hinge surface 232 contiguous with the bottom surface 230 of the second mounting arm 116 and aligned substantially parallel with the reference line RL, and a top surface 234 contiguous with the hinge surface 232 of the second mounting arm 116 and angled opposite the bottom surface 230 of the second mounting arm 116 with respect to the reference line RL. As noted above, the surfaces of the first mounting arm 114 are shaped complementary to the surfaces of the first nesting feature 166 and the surfaces of the second mounting arm 116 are shaped complementary to the surfaces of the second nesting feature 168. When the hub 110 and the first vane 140 (and other vanes) are simultaneously additively manufactured as distinct, but inseparable monolithic components, a gap G is defined between the surfaces of the first mounting arm 114 and the surfaces of the first nesting feature 166 as well as the surfaces of the second mounting arm 116 and the surfaces of the second nesting feature 168.

Notably, none of the surfaces of the nesting features 166, 168 of the vane hinge member 150, the first mounting arm 114, or the second mounting arm 116 are aligned directly along the axial direction A. Accordingly, as the hinge assembly 100 is built up along the vertical direction V, the gaps between the mounting arms 114, 116 and the vane hinge member 150 are maintained and the first mounting arm 114, the second mounting arm 116, and the first vane 140 (and other vanes) are all adequately supported thus producing a high fidelity additively manufactured hinge assembly.

Figure 11:
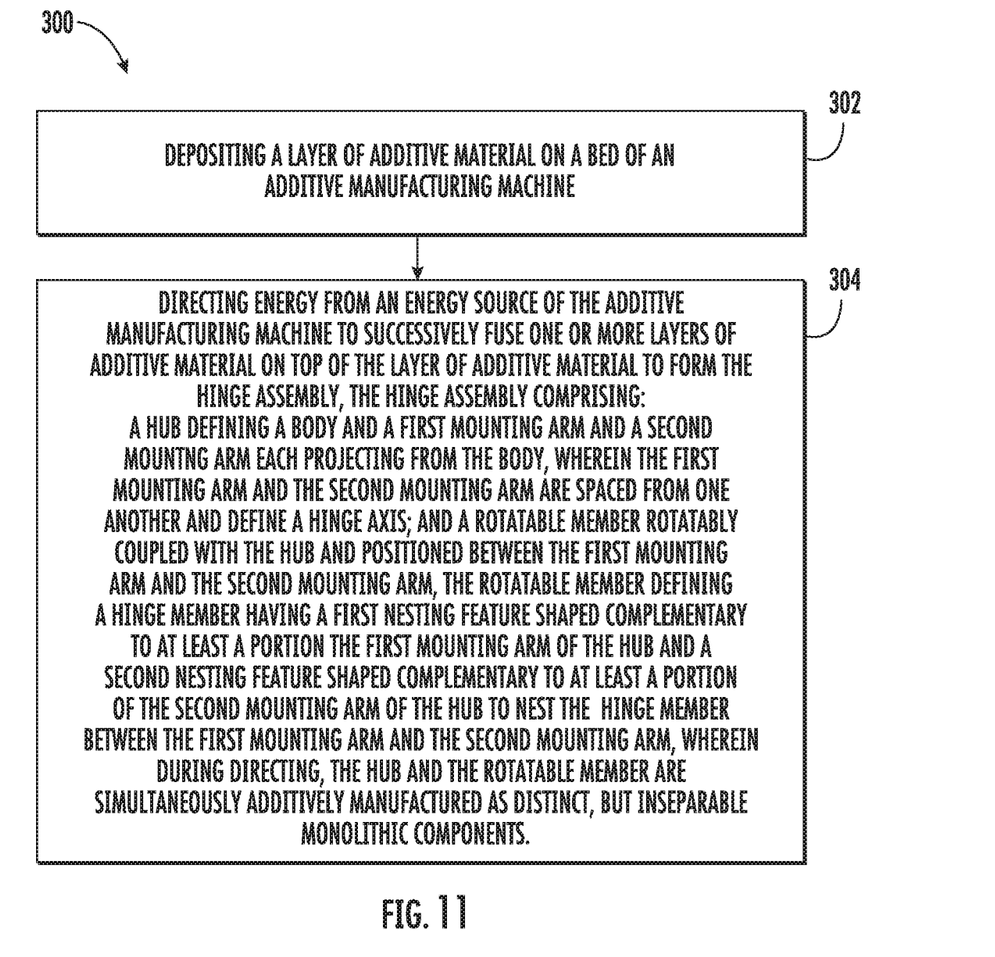
FIG. 11 provides a flow diagram of an exemplary method in accordance with an exemplary aspect of the present disclosure.

FIG. 11 provides a flow diagram of an exemplary method (300) for manufacturing a hinge assembly in accordance with exemplary embodiments of the present disclosure. For instance, the exemplary method (300) may be utilized to additively manufacture the hinge assembly 100 of the present disclosure using one or more of the additive manufacturing techniques described above. It should be appreciated that the exemplary method (300) is discussed herein only to describe exemplary aspects of the present subject matter, and is not intended to be limiting.

At (302), the method (300) includes depositing a layer of additive material on a bed of an additive manufacturing machine. For instance, an additive manufacturing machine may deposit a layer of additive material on a bed or platform, e.g., the platform 195 shown in FIG. 4. The layer of additive material may be formed of any suitable material, such as e.g., metal, some other material noted herein, or a combination thereof.

At (304), the method (300) includes selectively directing energy from an energy source of the additive manufacturing machine to successively fuse one or more layers of additive material on top of the layer of additive material to form the hinge assembly. For instance, the hinge assembly 100 formed may be similar in some or all respects to one of the hinge assemblies 100 described above.

For instance, in some implementations, the hinge assembly formed at (304) may include a hub defining a body and a first mounting arm and a second mounting arm each projecting from the body. The first mounting arm and the second mounting arm are spaced from one another and define a hinge axis. The hinge assembly also includes a rotatable member, e.g., a vane, rotatably coupled with the hub and movable about the hinge axis between a retracted position and an extended position. The rotatable member defines a hinge member, e.g., a vane hinge member, having a first nesting feature shaped complementary to at least a portion of the first mounting arm and a second nesting feature shaped complementary to at least a portion of the second mounting arm to nest the hinge member between the first mounting arm and the second mounting arm. In some implementations, the hub and the rotatable member are simultaneously additively manufactured as distinct, but inseparable monolithic components. That is, the rotatable member and the hub are printed in a single print as distinct components, but yet the rotatable member is inseparably joined with the hub as the hinge member is nested with the hub between the first and second mounting arms.

In some implementations, during directing energy from the energy source of the additive manufacturing machine to successively fuse the one or more layers of additive material on top of the layer of additive material to form the hinge assembly at (304), the hinge assembly is formed such that the hinge axis is defined along a direction orthogonal to the axial direction. For instance, as shown best in FIG. 6, the hinge axis HA is defined along a direction (e.g., the first direction D1) orthogonal to the axial direction A.

In yet other implementations, during directing energy from the energy source of the additive manufacturing machine to successively fuse the one or more layers of additive material on top of the layer of additive material to form the hinge assembly at (304), the hinge assembly is formed such that the hinge axis is defined angled with respect to the axial direction and angled with respect to a direction orthogonal to the axial direction. For instance, as shown best in FIG. 10, the hinge assembly 100 is formed such that the hinge axis HA is defined angled with respect to the axial direction A and angled with respect to a direction orthogonal to the axial direction A. Particularly, for the depicted embodiment of FIG. 10, the hinge axis HA is defined angled with respect to the axial direction A by about eighty degrees (80°) and angled with respect to the plane or direction orthogonal to the axial direction A by about twenty degrees (20°).

In some implementations, during directing energy from the energy source of the additive manufacturing machine to successively fuse the one or more layers of additive material on top of the layer of additive material to form the hinge assembly at (304), the hinge assembly is formed such that the first nesting feature defined by the hinge member has a bottom surface, a hinge surface contiguous with the bottom surface, and a top surface contiguous with the hinge surface. The hinge assembly is also formed at (304) such that the second nesting feature defined by the hinge member has a bottom surface, a hinge surface contiguous with the bottom surface of the second nesting feature, and a top surface contiguous with the hinge surface of the second nesting feature. Moreover, during directing at (304), the hinge assembly is formed such that none of the surfaces of the first and second nesting features are aligned along the vertical direction. For instance, as shown best in FIG. 10, the bottom surface 200, the hinge surface 202, and the top surface 204 of the first nesting feature 166 and the bottom surface 210, the hinge surface 212, and the top surface 214 of the second nesting feature 168 of the vane hinge member 150 are not aligned along the vertical direction V. In this way, the surfaces are not built directly vertically upward during printing; rather, the surfaces are printed at angles, which may increase the fidelity of the final hinge assembly 100 and may better maintain the gap clearance between the surfaces of the hinge member and the first and second mounting arms 114, 116.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additively manufactured hinge assembly, comprising:
   a hub defining a body and a first mounting arm and a second mounting arm each projecting from the body, wherein the first mounting arm and the second mounting arm are spaced from one another and define a hinge axis; and
   a rotatable member rotatably coupled with the hub and movable about the hinge axis between a retracted position and an extended position, the rotatable member defining a hinge member having a first nesting feature shaped complementary to at least a portion of the first mounting arm and a second nesting feature shaped complementary to at least a portion of the second mounting arm to nest the hinge member between the first mounting arm and the second mounting arm, wherein the first nesting feature of the hinge member has a first converging surface, a first hinge surface, and a first diverging surface and the second nesting feature of the hinge member has a second converging surface, a second hinge surface, and a second diverging surface, and wherein the hinge assembly defines an axial direction, and wherein the first hinge surface extends substantially along the axial direction and the first converging surface and the second diverging surface are both angled with respect to the first hinge surface and are angled substantially orthogonal to one another, and wherein the second hinge surface extends substantially along the axial direction and the second converging surface and the second diverging surface are both angled with respect to the second hinge surface and are angled substantially orthogonal to one another, and wherein the hub and the rotatable member are simultaneously additively manufactured as distinct, but inseparable monolithic components.

2. The hinge assembly of claim 1, wherein the first converging surface is angled at about forty-five degrees (45°) with respect to the first hinge surface and the second converging surface is angled at about forty-five degrees (45°) with respect to the second hinge surface.

3. The hinge assembly of claim 1, wherein the first mounting arm has a first converging surface, a first hinge surface, and a first diverging surface and the second mounting arm has a second converging surface, a second hinge surface, and a second diverging surface.

4. The hinge assembly of claim 3, wherein the first converging surface of the first mounting arm is shaped complementary to the first converging surface of the first nesting feature, the first hinge surface of the first mounting arm is shaped complementary to the first hinge surface of the first nesting feature, the first diverging surface of the first mounting arm is shaped complementary to the first diverging surface of the first nesting feature, and wherein the second converging surface of the second mounting arm is shaped complementary to the second converging surface of the second nesting feature, the second hinge surface of the second mounting arm is shaped complementary to the second hinge surface of the second nesting feature, and the second diverging surface of the second mounting arm is shaped complementary to the second diverging surface of the second nesting feature.

5. The hinge assembly of claim 4, wherein when the hub and the rotatable member are simultaneously additively manufactured as distinct, but inseparable monolithic components, a gap is defined between the first converging surface of the first mounting arm and the first converging surface of the first nesting feature, the first hinge surface of the first mounting arm and the first hinge surface of the first nesting feature, the first diverging surface of the first mounting arm and the first diverging surface of the first nesting feature, the second converging surface of the second mounting arm and the second converging surface of the second nesting feature, the second hinge surface of the second mounting arm and the second hinge surface of the second nesting feature, and the second diverging surface of the second mounting arm and the second diverging surface of the second nesting feature.

6. The hinge assembly of claim 1, wherein the first mounting arm, the second mounting arm, and the hinge member define a hinge pin bore that extends along the hinge axis.

7. The hinge assembly of claim 6, wherein the hinge assembly defines an axial direction, and wherein the hinge pin bore extends substantially along a direction orthogonal to the axial direction.

8. The hinge assembly of claim 6, wherein the hinge assembly defines an axial direction, and wherein the hinge pin bore is angled with respect to the axial direction and a direction orthogonal to the axial direction.

9. The hinge assembly of claim 8, wherein the hinge pin bore is angled with respect to the axial direction and the direction orthogonal to the axial direction by at least fifteen degrees (15°).

10. The hinge assembly of claim 1, wherein the hinge member defines a reference line that is angled with respect to the axial direction and orthogonal to the hinge axis, and wherein the first nesting feature of the hinge member defines a bottom surface angled with respect to the reference line, a hinge surface contiguous with the bottom surface and aligned substantially parallel with the reference line, and a top surface contiguous with the hinge surface and angled opposite the bottom surface with respect to the reference line, and wherein the second nesting feature of the hinge member defines a bottom surface angled with respect to the reference line, a hinge surface contiguous with the bottom surface of the second nesting feature and aligned substantially parallel with the reference line, and a top surface contiguous with the hinge surface of the second nesting feature and angled opposite the bottom surface of the second nesting feature with respect to the reference line.

11. The hinge assembly of claim 10, wherein the first mounting arm defines a bottom surface angled with respect to the reference line, a hinge surface contiguous with the bottom surface of the first mounting arm and aligned substantially parallel with the reference line, and a top surface contiguous with the hinge surface of the second mounting arm and angled opposite the bottom surface of the first mounting arm with respect to the reference line, and wherein the second mounting arm defines a bottom surface angled with respect to the reference line, a hinge surface contiguous with the bottom surface of the second mounting arm and aligned substantially parallel with the reference line, and a top surface contiguous with the hinge surface of the second mounting arm and angled opposite the bottom surface of the second mounting arm with respect to the reference line.

12. The hinge assembly of claim 11, wherein the bottom surface, the hinge surface, and the top surface of the first mounting arm are shaped complementary to the bottom surface, the hinge surface, and the top surface of the first nesting feature, respectively, and wherein the bottom surface, the hinge surface, and the top surface of the second mounting arm are shaped complementary to the bottom surface, the hinge surface, and the top surface of the second nesting feature, respectively, and wherein when the hub and the rotatable member are simultaneously additively manufactured as distinct, but inseparable monolithic components, a gap is defined between the surfaces of the first nesting feature and the first mounting arm and a gap is defined between the surfaces of the second nesting feature and the second mounting arm.

13. The hinge assembly of claim 1, wherein the hinge assembly defines a vertical direction, and wherein the hub and the rotatable member are additively manufactured on a build platform along the vertical direction.

14. The hinge assembly of claim 1, wherein the hinge assembly comprises a plurality of layers of additive material formed by:

depositing a layer of additive material on a bed of an additive manufacturing machine; and directing energy from an energy source of the additive manufacturing machine to successively fuse the plurality of layers of additive material on top of the layer of additive material.

15. An additively manufactured hinge assembly, comprising:
a hub defining a body and a first mounting arm and a second mounting arm each projecting from the body, wherein the first mounting arm and the second mounting arm are spaced from one another and define a hinge axis; and
a rotatable member rotatably coupled with the hub and movable about the hinge axis between a retracted position and an extended position, the rotatable member defining a hinge member having a first nesting feature shaped complementary to at least a portion of the first mounting arm and a second nesting feature shaped complementary to at least a portion of the second mounting arm to nest the hinge member between the first mounting arm and the second mounting arm, and wherein the hub and the rotatable member are simultaneously additively manufactured as distinct, but inseparable monolithic components, and
wherein the first mounting arm, the second mounting arm, and the hinge member define a hinge pin bore that extends along the hinge axis.

16. The hinge assembly of claim 15, wherein the hinge assembly defines an axial direction, and wherein the hinge pin bore extends substantially along a direction orthogonal to the axial direction.

17. The hinge assembly of claim 15, wherein the hinge assembly defines an axial direction, and wherein the hinge pin bore is angled with respect to the axial direction and a direction orthogonal to the axial direction, and wherein the hinge pin bore is angled with respect to the axial direction and the direction orthogonal to the axial direction by at least fifteen degrees (15°).

18. An additively manufactured hinge assembly, comprising:
a hub defining a body and a first mounting arm and a second mounting arm each projecting from the body, wherein the first mounting arm and the second mounting arm are spaced from one another and define a hinge axis; and
a rotatable member rotatably coupled with the hub and movable about the hinge axis between a retracted position and an extended position, the rotatable member defining a hinge member having a first nesting feature shaped complementary to at least a portion of the first mounting arm and a second nesting feature shaped complementary to at least a portion of the second mounting arm to nest the hinge member between the first mounting arm and the second mounting arm, and wherein the hub and the rotatable member are simultaneously additively manufactured as distinct, but inseparable monolithic components, and
wherein the hinge member defines a reference line that is angled with respect to the axial direction and orthogonal to the hinge axis, and wherein the first nesting feature of the hinge member defines a bottom surface angled with respect to the reference line, a hinge surface contiguous with the bottom surface and aligned substantially parallel with the reference line, and a top surface contiguous with the hinge surface and angled opposite the bottom surface with respect to the reference line, and wherein the second nesting feature of the hinge member defines a bottom surface angled with respect to the reference line, a hinge surface contiguous with the bottom surface of the second nesting feature and aligned substantially parallel with the reference line, and a top surface contiguous with the hinge surface of the second nesting feature and angled opposite the bottom surface of the second nesting feature with respect to the reference line.

19. The hinge assembly of claim 18, wherein the first mounting arm defines a bottom surface angled with respect to the reference line, a hinge surface contiguous with the bottom surface of the first mounting arm and aligned substantially parallel with the reference line, and a top surface contiguous with the hinge surface of the second mounting arm and angled opposite the bottom surface of the first mounting arm with respect to the reference line, and wherein the second mounting arm defines a bottom surface angled with respect to the reference line, a hinge surface contiguous with the bottom surface of the second mounting arm and aligned substantially parallel with the reference line, and a top surface contiguous with the hinge surface of the second mounting arm and angled opposite the bottom surface of the second mounting arm with respect to the reference line.

20. The hinge assembly of claim 19, wherein the bottom surface, the hinge surface, and the top surface of the first mounting arm are shaped complementary to the bottom surface, the hinge surface, and the top surface of the first nesting feature, respectively, and wherein the bottom surface, the hinge surface, and the top surface of the second mounting arm are shaped complementary to the bottom surface, the hinge surface, and the top surface of the second nesting feature, respectively, and wherein when the hub and the rotatable member are simultaneously additively manufactured as distinct, but inseparable monolithic components, a gap is defined between the surfaces of the first nesting feature and the first mounting arm and a gap is defined between the surfaces of the second nesting feature and the second mounting arm.

* * * * *